(12) United States Patent
Schmid et al.

(10) Patent No.: US 6,809,173 B2
(45) Date of Patent: Oct. 26, 2004

(54) ANIONICALLY PRODUCED POLYAMIDE AND METHOD FOR THE PRODUCTION THEREOF AND ALSO A METHOD FOR REPROCESSING POLYAMIDE

(75) Inventors: Eduard Schmid, Bonaduz (CH); Ivano Laudonia, Thusis (CH); Hansjörg Ernst, Bonaduz (CH); Werner Kägi, Domat/Ems (CH)

(73) Assignee: EMS-Chemie AG (CH)

( * ) Notice: Subject to any disclaimer, the term of this patent is extended or adjusted under 35 U.S.C. 154(b) by 62 days.

(21) Appl. No.: 10/120,875

(22) Filed: Apr. 11, 2002

(65) Prior Publication Data

US 2003/0032766 A1 Feb. 13, 2003

(30) Foreign Application Priority Data

Apr. 12, 2001 (DE) .......................................... 101 18 453

(51) Int. Cl.[7] .......................... C08G 69/20; C08G 69/08
(52) U.S. Cl. ........................ 528/310; 528/312; 528/315; 528/318; 528/323; 528/326
(58) Field of Search ................................. 528/310, 312, 528/315, 318, 323, 326; 526/310

(56) References Cited

U.S. PATENT DOCUMENTS 4,614,792 A * 9/1986 Bongers et al. ............. 528/318
5,756,647 A * 5/1998 Schmid et al. ............... 528/323
5,864,007 A * 1/1999 Schmid et al. ............... 528/323

FOREIGN PATENT DOCUMENTS

| DE | 2241131 | | 3/1973 |
| DE | 2241132 | | 3/1973 |
| DE | 2241133 | | 3/1973 |
| DE | 197 679 C2 | | 10/1998 |
| EP | 0693 515 A1 | * | 7/1995 |
| EP | 0786 485 A2 | * | 1/1997 |
| EP | 0905166 A1 | | 3/1999 |

OTHER PUBLICATIONS

Technische Thermoplaste POLYAMIDE; Kunststoff Handbuch; vol. 3/4, 1998.
S.K. HA & J.A. White; Continuous polymerization and Copolymerization of Lauryl Lactam in a Modular Corotating Twin Screw Extruder; Hanser Publishers, Munich; pp. 136–141, 1998.
Rompp–Lexikon Chemie, 10th Edition, HRSG. Jurgen Falbo pp. 2739, 3437, 3438 and 4875.

* cited by examiner

Primary Examiner—P. Hampton-Hightower
(74) Attorney, Agent, or Firm—Marshall & Melhorn, LLC

(57) ABSTRACT

The invention relates to a polyamide with low viscosity degradation after remelting which can be produced by anionic polymerization of lactam in the presence of alkaline catalysts and if necessary activators and the method for production of the polyamide. The invention relates furthermore to a method for reprocessing anionically produced polyamide.

36 Claims, 7 Drawing Sheets

Fig. 1

Table 1 for Test X1 and 1 - 6

(supplements in g/kg granulate)

| Test No. | X1 | 1 | 2 | 3 | 4 | 5 | 6 |
|---|---|---|---|---|---|---|---|
| Supplement | | | | | | | |
| ○ | none | | | | | | |
| ○2-ethylhexane acid | | 0.4 | | | | | |
| ○stearic acid | | | 0.8 | | | | |
| ○sebacic acid | | | | 0.3 | | | |
| ○Primacor 3340 | | | | | 3.0 | | |
| ○Surlyn 9320 | | | | | | 5.0 | |
| ○Acrawachs C | | 0.5 | | | | | |
| ○Boric acid | | | | | | | 0.2 |
| ○$\eta_{rel}$ test specimen | 2.102 | 2.315 | 2.236 | 2.368 | 2.389 | 2.346 | 2.324 |
| ○Degradation during injection moulding: $\Delta\eta_{rel}$ | 0.300 | 0.087 | 0.166 | 0.034 | 0.013 | 0.056 | 0.078 |
| ○MVR | 120 | 18 | 30 | 29 | 9 | 21 | 21 |
| ○VKA | 0.153 | 0.044 | 0.084 | 0.017 | 0.007 | 0.028 | 0.04 |

Note: the starter granulate has a relative solution viscosity of 2.402 (i.e. $\eta_{sp.1} = 2.402 - 1 = 1.402$).

Fig. 2

Table 3

Preperation of anionically polymerised, viscosity-unstable PA-12 basic granulate

| Comparative test No. | X3 | X4 | X5 |
|---|---|---|---|
| Mol parts LC-12 per val of the liquid catalyst | 200 | 170 | 225 |
| Set temperature of the housings of the polymerisation zone °C | 270 | 270 | 270 |
| Throughput kg/h | 10 | 12 | 10 |
| Speed rpm | 150 | 150 | 150 |
| Characterisation of the granulates | | | |
| Lactam-12 residual content % by weight | 0.27 | 0.34 | 0.51 |
| rel initial viscosity | 2.30 | 2.09 | 2.40 |
| MVR values | 45 | 61 | 24 |
| $\eta_{rel}$ in molten cone | 1.98 | 1.92 | 2.10 |
| Viscosity degradation, $\Delta\eta_{rel}$ | 0.32 | 0.17 | 0.30 |
| VKA | 0.19 | 0.14 | 0.15 |

Fig. 3

Table 4

Production of polyamide moulding compounds according to the invention via melt mixing in a twin shaft extruder, ZSK-30

| Test No. | 10 | 11 | 12 | 13 | 14 | 15 |
|---|---|---|---|---|---|---|
| Composition (parts by weight) | | | | | | |
| Polylactam from comparison v X3 | 85 | 82 | | | | |
| Polylactam from comparison v X4 | | | 80 | 83 | 90 | |
| Polylactam from comparison v X5 | | | | | | 80 |
| a) Surlyn 9320 | | 3 | 5 | 2 | 2 | 5 |
| b) Primacor 3340 | | | | | 3 | |
| c) Masterbatch based on PA-12 with stabiliser | 5 | 5 | 5 | 5 | 5 | 5 |
| d) Aminolauric acid | 0.65 | | | 0.30 | | |
| e) butylbenzenesulfonamide | 10 | 10 | 10 | 10 | - | 10 |
| Granulate properties | | | | | | |
| • $\eta_{rel}$ granulate | 1.74 | 2.06 | 1.95 | 1.88 | 1.96 | 2.06 |
| • MVR | 290 | 17.5 | 26.0 | 72 | 38 | 23.0 |
| • $\eta_{rel}$ melting cone | 1.68 | 2.06 | 1.99 | 1.87 | 1.94 | 2.06 |
| • $\Delta\eta_{rel}$ | 0.06 | none | none | 0.01 | 0.02 | None |
| • $\eta_{rel}$ finished wedge | | 2.07 | 1.98 | 1.89 | | 2.07 |
| • type - pipe | | | | | | |
| • type - cable | | | | | 1.93 | |
| • VKA | 0.11 | 0 | 0 | 0.01 | 0.02 | 0 |

Fig. 4

Table 5a

Direct production of granulates according to the invention, containing stabilisers

| Test No. | X6 | 16 | 17 | 18 | 19 |
|---|---|---|---|---|---|
| Deactivator | | | | | |
| ○Surlyn 9320 | | 7 | | | |
| ●Luvax EAS | | | 1.5 | | |
| ○Primacor 3340 | | | | | 3.5 |
| ○Lucalen 2920 | | | | 6 | |
| ○Granulates (properties) | | | | | |
| ○$\eta_{rel}$ | 1.95 | 2.05 | 1.99 | 2.12 | 2.18 |
| ●MVR | 72 | 25.5 | 62.7 | 10.8 | 15.2 |
| ○$\eta_{rel}$ cone | 1.85 | 2.00 | 1.88 | 2.09 | 2.11 |
| ○$\Delta \eta_{rel}$ | 0.10 | 0.05 | 0.11 | 0.03 | 0.07 |
| ●MGV (per 1000) | | | | | |
| "-number" $M_n$ | 5.5 | 31 | 18.5 | | 23 |
| "-weight" $M_w$ | 28 | 69 | 41.5 | | 53.0 |
| Polydispersity D | 5.1 | 2.2 | 2.2 | | 2.3 |
| VKA | 0.11 | 0.05 | 0.11 | 0.02 | 0.05 |

Fig. 5

Table 5b

Heat storage and weathering

Test on SZZ bars; measured value; SZZ [kj/m²]

| Heat storage at 150 °C | Test No. | | | | |
|---|---|---|---|---|---|
| | 6x | 16 | 17 | 18 | 19 |
| Hours   0 = start | 330 | 490 | 320 | 540 | 530 |
| 48 | 225 | 360 | 220 | 330 | 290 |
| 72 | 60 | 260 | 190 | 220 | 250 |
| 144 | 15 | 200 | 40 | 200 | 240 |
| 192 | - | 41 | - | 175 | 90 |
| 288 | - | 20 | - | 40 | 35 |
| Rapid weathering/Wether-O-meter | | | | | |
| Hours   0 = start | 330 | 490 | 500 | 540 | 530 |
| 250 | 430 | 550 | 400 | 540 | 530 |
| 500 | 380 | 510 | 400 | 520 | 440 |
| 750 | 420 | 440 | 410 | 470 | 450 |
| 1000 | 340 | 470 | 420 | 430 | 400 |
| 1250 | 400 | 440 | 360 | 420 | 390 |
| 1500 | 370 | 380 | 350 | 400 | 360 |
| 2000 | 300 | 315 | 310 | 340 | 330 |
| 3000 | 220 | 240 | 290 | 250 | 270 |

Fig. 6

Table 6

Comparison of different deactivators used with granulate corresponding to 125 mol LC-12 per mol liquid catalyst; supplement in % by weight

| Test No. | 20 | 21 | 22 | 23 | 124 |
|---|---|---|---|---|---|
| Deactivator | | | | | |
| ○H$_3$PO$_4$, 85% | | | | 0.175 | |
| ○Primacor 1410 | 4.0 | | | | |
| ○Primacor 3340 | | 5.0 | | | |
| ○Lucalen 2920 | | | 10.0 | | |
| ●SMA 1000 | | | | 0.53 | |
| ●IPS | | | | | 0.38 |
| Analysis | | | | | |
| ○ $\eta_{rel}$ | 1.78 | 1.76 | 1.73 | 1.77 | 1.80 |
| ○MVR | 128 | 138 | 126 | 205 | 161 |
| ○ $\eta_{rel}$ cone | 1.77 | 1.76 | 1.72 | 1.74 | 1.76 |
| ○VKA | 0.02 | 0 | 0.02 | 0.05 | 0.06 |
| Mechanical values | | | | | |
| ○ KSZ 23 °C | 6.3 | 6.3 | 6.8 | | 6.1 |
| -40 °C | 6.3 | 6.1 | 6.3 | 6.4 | 6.1 |
| ○ flow resistance | 40 | 39 | 37 | 43 | 43 |
| ○ rupture strength | 61 | 58 | 60 | 60 | 67 |
| ○ breaking elongation | 430 | 410 | 450 | 400 | 460 |

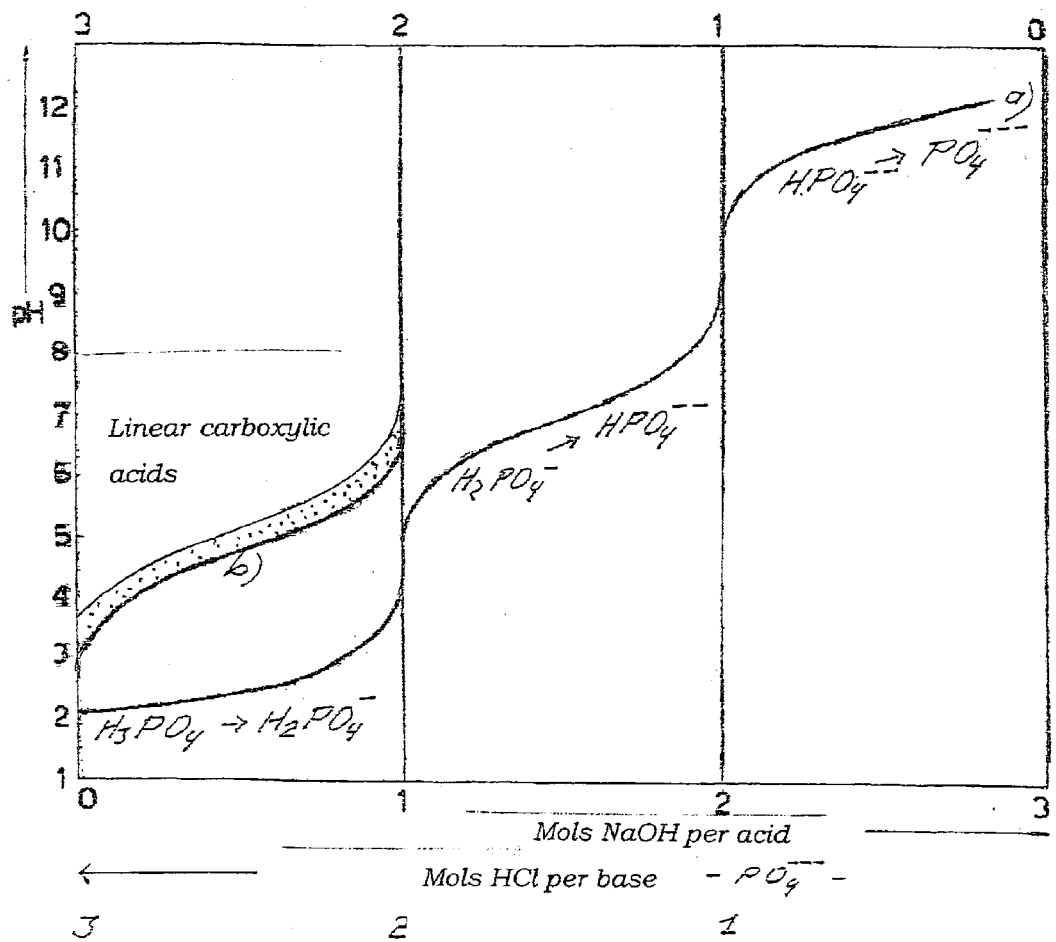
Fig. 7    Buffer areas

US 6,809,173 B2

ANIONICALLY PRODUCED POLYAMIDE AND METHOD FOR THE PRODUCTION THEREOF AND ALSO A METHOD FOR REPROCESSING POLYAMIDE

BACKGROUND OF THE INVENTION

1. Field of the Invention

The invention relates to a polyamide which is degradation-stable on remelting and produced by the anionic polymerisation of lactam. Furthermore, the invention relates to the production of the polyamide using an anionic catalyst system, preferably in a continuous process. The procedure thereby is such that the polymerisation proceeds in a defined processing zone until the conversion of lactam into polylactam has just been effected, after that the activity of the catalyst is neutralized by homogeneous mixing-in of protic compounds, after which further process steps can follow. As a result, a polyamide moulding compound is successfully produced which is stable on reprocessing.

The invention relates furthermore to a method for reprocessing anionically produced polyamide, in which polyamide is crushed and then mixed with the deactivator, melted and extruded.

2. Discussion of Related Art

Anionic lactam polymerisation is comprehensively described in Plastic Material Handbook 3/4, "Polyamides", Carl Hanser Press, Munich 1998. In practical application, in particular activated anionic lactam polymerisation has thereby been successful and is used preferably for producing tough, voluminous cast parts (cast polyamide).

The activator group, which has acylated the first lactam molecule, thereby forms the one chain end, after which lactamate effects actual chain growth, with ring-opening and reformation of lactamate.

A multiplicity of patents for activated anionic lactam polymerisation relates to the activators.

A special system has become known from DE 197 15 679 A1. Accordingly, species are contained in a salvation medium which, upon addition to the lactam melt, embrace the activator and the catalyst function, so that only one more component must be added to the lactam melt, which component directly initiates then the accelerated lactam polymerisation.

In S. K. Ha, J. L. White: Continuous Polymerisation and Co-polymerization of Lauryl Lactam in a Modular Corotating Twin Screw Extruder, Intern. Polymer Processing XIII (1998) 2, p. 136–141, tests are described where, with separate addition of catalyst (Na-caprolactamate dissolved in lactam-6) and also activator, the lactam polymerisation is implemented continuously in a twin screw extruder. In particular, method parameters are thereby described and optimised. Experiments for further conversion of the granulates and experiments on the behaviour of parts made of anionic polymerised lactam are not described.

A method is known furthermore from DE-OS 22 41 133 for producing polyamides with a high molecular weight. This method also concerns an anionic polymerisation of lactams in anhydrous medium in the presence of alkaline catalysts. It is proposed therein that one or more compounds are added to the obtained polymer which, in the given method conditions, are more strongly acidic than the amide function of the polymers and the lactams and lead only to a limited acidolysis of the polymer chains or to acidolysis equal to 0. For this purpose, sulphonic acid or sulphonic acid esters are proposed as compounds.

As was shown by means of laboratory tests, this freshly polymerised melt could however only be stabilised inadequately. If in fact the acidic supplements mentioned there, especially in the described molar excess, are used in a commonly used extrusion process, then massive corrosion of the machine parts occurs. Furthermore, it has emerged that when a corresponding extrusion strand is drawn as normal through a water bath for cooling and subsequent granulation, $H_3O^+$ ions are formed which effect a chain split during remelting for the thermoplastic shaping. Correspondingly acidically set polyamide moulding bodies thereby proved also to be unsuitable for practical usage because they are susceptible to degradation by the effects of hydrolysis, heat and radiation, which leads in particular to a strong viscosity degradation during remelting.

Further methods for neutralizing the catalyst are disclosed in DE-OS 22 41 132 and also in DE-OS 22 41 131. In the first mentioned publication, open to public inspection, tertiary alcohols are mixed in, in particular t-butyl alcohol and in the last mentioned malonic acid esters.

During examination of the last mentioned methods, it emerged that the weak protic compounds added thereto only slow down the anionic lactam polymerisation but do not interrupt it entirely so that this is also displayed in a constantly slight reduction of the MVR (volume melt index), i.e. a nevertheless slight increase in the molecular weight.

It should however be mentioned specially that in particular conventionally anionically produced, non-neutralized polyamide suffers a massive chain length- or viscosity degradation on remelting. Reference is made to EP 0 905 166 A1 in this respect.

It can therefore be established in summary that no anionically produced polyamide is known from the state of the art which displays only a slight viscosity change on remelting.

Proceeding herefrom, it is therefore the object of the present invention to indicate a polyamide which has good physical properties, in particular with respect to processing stability and which at the same time displays only a "slight" viscosity degradation on remelting.

BRIEF DESCRIPTION OF THE DRAWINGS

FIG. 1 shows the experimental results of tests according to the present invention compared to a comparison sample;

FIG. 2 shows comparative test conditions and results;

FIG. 3 shows tabular results of the production of polyamide molding compounds PA-12 according to the Invention by melt mixing in a twin shaft extruder;

FIG. 4 shows tabular results of additional deactivators;

FIG. 5 shows the results of heat storage and weathering tests on SZZ bars;

FIG. 6 shows a comparison of different deativators used with granulate corresponding to 125 mol LC-12 liquid catalyst and FIG. 7 shows a graphical representation of the pH of a buffering solution against either mols HCl for a base or mats NaOH for an acid.

DESCRIPTION OF THE PREFERRED EMBODIMENT

The invention is achieved with respect to the polyamide by the characterizing features of patent claim 1 and with respect to the method for production by the characterizing features of patent claim 16. The features of claim 28 relate to the method for reprocessing polyamide which was produced via anionic polymerisation according to the conventional method without deactivation of the catalyst. The sub-claims show advantageous developments.

The inventors were able to show that the disadvantages of the state of the art are eliminated if the lactam melt is polymerised just until the conversion of lactam into polylactam is effected to at least 90% by weight, preferably to 99% by weight up to approximately 99.9% by weight, then the catalyst (the lactamate) is destroyed rapidly and entirely by adding a lactamate-protonising compound (deactivator) in the form of a protic compound (after which further method steps can follow) and subsequently the corresponding polylactam melt is granulated for further use according to normal methods, or it is used directly for producing formed pieces.

The thus obtained polyamide then still contains the deactivator. The deactivator, i.e. the protic compound is thereby still partly in its protic form preferably in a residual proportion of at least 1% of the starter value. The polyamide according to the invention has furthermore preferably a polydispersity D of $\leq 5.0$ and also a relative viscosity $\eta_{rel}$ of $\geq 1.55$, measured according to EN ISO 307. The polydispersity of polymers and determination thereof is described for example in Römpp Dictionary Chemistry, $10^{th}$ Edition, page 2735. It is notable that the polyamides obtained according to the invention show in most cases a D value $\leq 3$, and that the relative viscosity is $\geq 1.7$.

In the case of the polyamide according to the invention, its stability during remelting should be stressed in particular.

The characterization of the stability is effected via the viscosity degradation $\Delta\eta_{rel}$ which is equal to the difference between the relative viscosities of the polyamide before and after remelting. Since however the viscosity degradation is dependent upon the starter viscosity, i.e. the molecular weight, a correlation, which is determined empirically by the inventors for characterizing the viscosity degradation, is used, said correlation producing a virtually constant value independently of the starter viscosity for a specific number of molecular chain cleavages per unit of weight of polymer.

The inventors were in fact able to show that the viscosity-corrected degradation is $$VKA = \frac{\Delta\eta_{rel}}{(\eta_{sp.1})^2}$$

As the inventors could verify, the "sensitivity" of a specific polymer to a specific viscosity degradation (expressed as $\Delta\eta_{rel}$) is hence in a ratio which is approximately quadratic to the specific starter viscosity $\eta_{sp.1}$. This applies at least for the range examined here. With respect to the definition of $\eta_{rel}$ and $\eta_{sp}$, reference is made to Römpp $10^{th}$ Edition page 4870. The specific viscosity $\eta_{sp}$ is thereby the polymer-specific portion of the relative viscosity $\eta_{rel}$, i.e. $\eta_{sp}=\eta_{rel}-1$, said polymer-specific portion exceeding the proportion of the pure solvent. According to the invention, the VKA of the polyamide is $\leq 0.13$, preferably $\leq 0.10$ and particularly preferred $\leq 0.08$.

Anionically produced polyamides with these properties have to date not become known in the state of the art.

Substances which destroy the catalyst rapidly and irreversibly are suitable as deactivator in the sense of the present invention.

Surprisingly, it has been shown that many classes of compounds are able to do this. Of concern here are preferably protic compounds with an acidity constant pK which is less than approximately 14. Organic carboxylic acids in oligomeric or low molecular form are used preferably; particularly preferred are also polymeric forms, whereby a stoichiometric 1:1 proportion of acidic functions to catalyst function is sufficient to destroy the catalyst entirely.

In the case of organic carboxylic acids, those are particularly preferred in which the carboxylic groups are sterically hindered, i.e. restricted and/or screened in their movability. Included herein are in particular compounds, i.e. deactivators in a polymer or oligomer form in which the COOH groups are bonded to the main chain. Examples are indicated in claims 7 and 8.

Representatives from the group of carboxylic acids are: stearic acid, versatic acid or benzoic acid, and also polyacids, such as for example dodecanedioic acid or also isoand terephthalic acid and also oligomeric, wax-like products, such as for example oxidized polyethylene waxes or else COOH group-containing polyamide oligomers which can be linear, branched or star-shaped with an average molecular weight of 500–10,000 g/mol and also preferably also carboxylic copolymers with a wide molecular weight spectrum. Examples are ethylene(meth)acrylic acid copolymers, whereby many further comonomers, such as long-chained or branched olefins, carboxylic acid esters, esterified alcohols etc. can be used as comonomers as well. Examples of such comonomers are butene, alkyl(meth) acrylate, vinyl alcohol and vinyl acetate and also styrene.

It was shown unexpectedly that acidic polymers are also exceedingly suitable when their COOH groups are partly neutralized with metal compounds and the counter-ions of the $COO^{\ominus}$ groups are derived for example from Na, K, Ca, Zn, Li and Mg. Such polyolefin derivatives are described as ionomers (see Römpp) and in particular the so-called Zn ionomers are exceptionally compatible with polylactam, such as for example polylaurin lactam and hence also highly effective with respect to catalyst destruction. If they contain further comonomers in a proportion suitable for application, then they can in addition increase toughness and for example make the product flexible. The desired translucence of the polyamide is thereby often not lost or in fact is increased. In many cases, normal so-called EAA copolymers (ethylene acrylic acid copolymers), such as are produced for example by the firm DOW with a very varied acid proportion and MVR, are however suitable. The molar proportion of added COOH groups can constitute thereby a multiple of the basicity of the catalyst which is to be deactivated. The added EAA then operates preferably also as impact modifier.

In summary, it can be established, that in the case of organic carboxylic acids in low molecular, but particularly in polymer form, those are particularly preferred, in which the carboxylic acid is directly incorporated in the polymer chain with steric hinderance, i.e. the carboxylic group is bonded directly to the main chain (backbone). In the case of mono- and dicarboxylic acids and also oxidized waxes, in which the carboxylic group is easily acccessible, or in the case of olefins with grafted-on maleic acid where the steric hinderance respectively is missing, the excess requires however to be limited.

The invention comprises furthermore, in the case of deactivators, the acids of phosphorus and boron. Acids of phosphorus in a monomeric and oligomeric form which have acidic groups of different acidity are hereby preferred. For example, $H_3PO_4$ and the condensation products resulting therefrom are suitable. In the case of acids of phosphorus, it is advantageous that these have a plurality of buffer areas, neutralization in the basic region often being suitable. In FIG. 7, buffer areas for a) phosphoric acid (H₃PO₄) and for b) the linear aliphatic carboxylic acids are illustrated.

The invention comprises all known lactams with respect to the starter component from a material point of view.

Particularly the representatives with 5–12 C atoms, in particular however lactam-6 and lactam-12 and mixtures thereof, are suitable as lactams, lactam-12 being particularly preferred because, even at temperatures of approximately 200–320° C., preferably 200–300° C. and particularly preferred 200–280° C., it can be converted into polylactam to at least 99% by weight and the conversion runs extensively irreversibly.

Catalysts and catalyst systems which are described in the literature, in particular metal lactamates or lactamate-forming compounds are suitable as catalysts.

Examples are sodium and magnesium lactamate and further magnesium compounds which are known from the literature. The mainly used catalyst is however commercially available sodium caprolactamate dissolved in caprolactam.

The activators used within the scope of the invention are known.

Activators operate as starters=initiators of the anionic lactam polymerisation, by activating the CONH bonds of the lactam and thus, upon admission of lactamate, initiating the starting reaction of the anionic polymerisation. Common commercially available activators are for example N-acylated lactams, such as for example N-acetylcaprolactam. Compounds also reacting directly with the lactam, such as isocyanates, which can also be capped according to the normal state of the art, and carbodiimides are often used which activate the CONH bond after acylation of the lactam. Examples of this are for example hexamethylene diisocyanate or phenyl isocyanate which can also occur trimerized in the isocyanurate form. If for example a diisocyanate is thereby used, then the polylactam chain grows after addition of the catalyst, or lactamate in two directions, if a monoisocyanate, such as for example phenyl isocyanate or also stearyl isocyanate, is used, the chain grows in one direction, these rules applying preferably as long as an excess of free lactam is present.

A preferred class of substances for implementing the described invention are catalyst-activator systems as are described for example in DE 197 156 79.

These are distinguished by the fact that only one formulation which in addition occurs preferably as an easily dosable liquid must be added to the lactam, in particular to the lactam melt.

According to patent claim 16, the invention relates furthermore to a method for producing polyamides as described above.

Anionically polymerized polylactam, in particular polycaprolactam has been used to date almost exclusively in the monomer casting process often for large volume parts, such as for example crane jibs because the procedure can start from a low viscose easily pourable melt. High fractive strength in particular is sought after and the molecular structure has no special requirements to satisfy with respect to recycling for example in thermoplastic shaping processes. Because of good processability in thermoplastic processes and thereby stability against degradation during remelting, today hydrolytically produced polylactam is used almost exclusively for the so-called thermoplastic shaping processes.

Formulations and methods for simplified production of polylactam which can then be further processed easily and without degradation and leads to parts of good application properties, therefore represent a substantial technical progress.

It has been shown astonishingly that the method according to the invention leads in particular to polyamide in granulate form, which can be shaped thermoplastically in an easy and stable manner into parts, such as for example pipes of a high application value.

The new method in the preferred embodiment is distinguished in that a lactam melt is converted by means of a catalyst-activator system with suitable reaction control until a lactam conversion of at least approximately 90% by weight, preferably 99% by weight of lactam-12, is effected, after which a deactivator is added which irreversibly destroys the catalyst, if necessary further processing steps follow directly, then a part is directly formed or the melt is converted directly into granulate which then can be processed thermoplastically into objects of high application value according to common methods.

The new process is suitable in particular for continuous methods, for which twin screw extruders with co-rotating screws and with special processing elements are particularly suitable.

However, the process can be conducted also in several steps by activating for example a lactam melt in a continuous process, for example by means of a dynamic (rotating) or also static continuous mixer with the catalyst/activator and then by polymerizing under constant feeding, for example in a single screw or also a twin screw extruder with suitable choice of temperature and residence time until the lactam is just converted into polylactam and then by removing and granulating it. Subsequently, the deactivator is added as far as possible at the beginning of the remelting process in a second extrusion passage, for example in an extruder for compounding tasks, such as for example a twin screw extruder, and is intermixed into the melt, the incorporated of all further compounds and additives, which are required for a commercial product, being then able to follow.

The method can also be implemented in varied ways, the main aim residing in attaining a polyamide which is stable during processing and which can be shaped without substantial degradation via melt processing into parts of a high service value.

At the beginning of implementation of the method it is of particular advantage that the catalyst/activator is distributed rapidly and homogeneously in the lactam melt and that the chain growth proceeds as uniformly as possible and that, after completion of the lactam conversion, the catalyst is destroyed rapidly and in the entire now-viscose polylactam mass. This presents process-technological requirements which suggest implementing the whole method in a continuously mixing machine with the necessary supply and mixing elements. Twin screw extruders with co-rotating screws, such as for example the commercial machine ZSK-25 of the company Werner and Pfleiderer, Stuttgart which can be equipped in an extraordinarily variable manner, with respect to process lengths, dosing devices, mixing and barrier elements, is suitable for optimizing the formulations and method conditions adapted to the application.

In the feed zone of the extruder, the lactam can thereby be melted or the extruder can be supplied with lactam melt also for example from a supply tank in a continuous manner. Now addition of the catalyst/activator into the lactam melt should be effected with rapid homogeneous mixing so that the polymerization is started as simultaneously as possible in the entire polylactam melt. This step can be implemented according to many alternative methods by processing for example according to the 2-pot principle which is well known in lactam polymerization or by adding solid catalyst as a solid material solution of sodium caprolactamate in caprolactam to the lactam in a solid or already molten form and then adding the activator, such as for example a liquid isocyanate, which can also occur in a capped or cyclized form or also dissolved, or of N-acylated lactam to the catalyst-containing lactam melt.

Systems, which directly initiate the polymerization and which hence contain simultaneously the function of catalyst and activator, are particularly suitable. Particularly preferred thereby are those systems which occur in a liquid form and which for example can be metered into the lactam melt directly by means of a liquid metering pump at a constant volume proportion, or which can be added directly via a static mixer to the lactam melt. Systems of this type are described in DE 197 15 679 A1.

After completion of the catalyst-activator addition and homogeneous mixing, the polymerisation process follows, preferably a plug flow is maintained so that all growing polylactam chains have as far as possible identical growth conditions which are defined in particular by the temperature in this zone and of course by the residence time.

As soon as the aimed lactam conversion is achieved (lactam-6 approximately 90%, lactam-12 approximately 99–99.9%), the catalyst activity is stopped by rapid and homogeneous mixing-in of the deactivator, and thereby the catalyst is destroyed. On effecting the method continuously, the addition zone for the deactivator should be separated from the polymerization zone in such a manner that as far as possible no backflow of deactivator into the polymerization zone occurs. The deactivator which can be used as a single substance or also as a substance mixture is often able to perform supplementary effects in the polylactam.

Preferably, the deactivator is therefore used as a substance mixture. All compounds described in the case of the polyamide are possible as deactivator.

If the deactivator is a long-chain acidic alkene containing comonomers such as for example butene, hexene, octene etc. or alkyl esters, such as for example originating from butylacrylate, it can also have a flexibilizing effect and significantly increase the toughness.

If the deactivator is an ionomer, for example based on Zn or Na or an EAA-copolymer which during the deactivation reaction also becomes an ionomer, and for example containing comonomers, such as for example alkylacrylate, then for example translucence is achieved together with high toughness and high flexibility which represents an additional advantage for particular applications. Such deactivators can also contain a high excess of COOH groups which are directly incorporated in the chain as long as the deactivator fulfils its supplementary objectives, such as for example an impact strength increase.

Different deactivators can of course be combined with each other according to the requirement of the final product. The deactivators can thereby be introduced in different ways, for example as a master batch in for example granulate form.

Deactivators of a polymeric nature or also pulverulent types are introduced into the melt for example via metering belt scales or a stuffing screw, of course the rules for metering and mixing, which are known from the state of the art, requiring to be observed. Deactivators can of course be fed also in a molten form via a so-called "side-feeder".

Together with the various deactivators or also subsequently, further additives, such as minerals, glass fibres, flame retardants, impact modifiers, colourants, stabilisers etc. and mixtures thereof can be added to the polylactam melt with the aim of providing a market product of good processability.

After that, these additives are mixed-in homogeneously and the ready formulated polylactam melt is supplied under pressure to the output nozzle of the extruder, and following normal technology, is converted into a granulate form or, in a suitable tool, for example a pipe head, is directly shaped for the application task, for example a covering or a coating, a pipe or a profile.

It has been shown that the method according to the invention as described previously is implemented best at temperatures of 140–320° C. Preferably, temperatures of 140–300° C., particularly preferred 140–280° C. are however used hereby.

The invention is now explained in more detail with reference to examples which represent only a selection of the various possibilities with respect to implementation and application.

It has been shown thereby that, within the scope of the invention, various method variants can be applied in order to avoid chain length degradation of anionically polymerized polylactam during processing via the melt and in order to obtain polyamide of a stable restricted molecular weight.

According to the patent claims 28 to 33, the invention relates furthermore to a method for reprocessing anionically produced polyamide.

A particular application of the method according to the invention, as explained above, is thereby of concern. It was presented already at the beginning that the method according to the invention, as characterized in patent claim 16, can also be implemented in two steps. Within the scope of the invention, it is therefore fundamentally not required that the steps a (polymerization) and b (deactivation) are implemented in succession but instead that also a fairly large time span, for example several days or even months or even a first application or life cycle, for example as matrix in a composite material or as a cast part can lie between step a and b. This implies in other words that the method according to the invention can also be implemented for polyamide which was already produced anionically a long time ago and that is treated with the deactivator as explained in patent claim 16. Hence the method according to the invention is suitable, as it is now characterized particularly by the patent claims 28 to 33, also for reprocessing of already present anionically produced polyamide. According to the invention, the deactivator is added thereto in such a quantity that at least the basicity still present from the catalyst system is neutralized. Then the mixture is melted and extruded in a manner which is known per se, optionally by adding auxiliary agents such as further matrix material, carbon black or stabilizers.

The reprocessing method according to the invention is particularly of advantage when the polyamide is present mixed with fibres. The method of the invention according to the patent claims 28–33 is preferably applied for filament structures, such as for example woven fabric, hosiery fabric, knitted fabric or plaited material, in a polyamide matrix in the form of a composite material.

It is then provided according to the method that these composite material parts are comminuted, followed by mixing with the deactivator according to the invention. This mixture is then subjected preferably to a continuous melting process in a twin screw extruder, whereby the melt is homogenized. Preferably the melt is then withdrawn as a strand via an aqueous cooling bath and cut into granulate.

In this way, a fibre-reinforced polylactam granulate of high service value is achieved which can be shaped by common thermoplastic processes, in particular by injection moulding into parts with new application possibilities. Without the method according to the invention often no material recycling was possible previously.

In the following summary, the abbreviations used in the examples and comparative examples are explained.

Compilation of the abbreviations of the Examples
1. Deactivators

| Designation | Manufacturer | Comments |
|---|---|---|
| Surlyn 9320 & 9120 | Du Pont, Delaware, US | Ionomer, partially neutralized with Zn |
| Primacor 3340 | Dow, Horgen, CH | Ethylene acrylic acid copolymer; 6.5% acrylic acid |
| Lucalen 2920 | BASF, Ludwigshafen | Copolyolefin with 4% acrylic acid |
| Luvax EAS | BASF, Ludwigshafen | Polyethylene wax with 5.5% acrylic acid |

According to requirement, additionally ethylene distearamide of trade name Acrawachs-C from Lonza (Basel, CH) was used as processing aid in the injection moulding process (for improved extruder feed), whereby Acrawachs-C has no deactivator function.

2. Analysis and Test Methods $\eta_{rel}$=relative viscosity, measured as a 0.5% by weight solution of polyamide in m-cresol according to EN ISO 307.

MVR (previously also often described as MVI), the volume melt index in $cm^3$ per 10 min. measured after a melting time of 4 min. at 275° C. and a load of 5 kg according to EN ISO 1133. Specific melting conditions are also established in this norm which are practical and which can be used for determining the viscosity degradation $\Delta\eta_{rel}$ or of VKA by using a MVR apparatus.

MGV=molecular weight distribution. This was determined after derivatisation of the samples with trifluoroacetic acid anhydride in tetrahydrofurane as solvent by means of GPC (Gel permeation chromatography). The polydispersity $D=M_w/M_n$ was determined therefrom (cf. Römpp).

3. Mechanical Values

SZZ bars: Impact tensile bars, 1 mm thick

SZZ: tensile impact strength, in $kJ/mm^2$

Heat storage: according to ICE 216

Weathering: according to ISO 4892-2

Tests 1–6 and comparative test X1

In order to perform the tests 1–6, the process was implemented in two steps so that initially anionically polymerized polyamide-12 in granulate form was produced by the continuous method and this was subsequently reprocessed into test pieces by injection moulding with the addition of supplements destroying the catalyst activity (deactivators).

In order to produce the granules, lactam-12 pills were predried and then supplied continuously to a twin screw extruder, ZSK-25, of the firm Werner and Pfleiderer Stuttgart, using a common compounding screw and usual process conditions, namely 150 rotations per minute, a constant set temperature of all barrel sections of 270° C., and a throughput of 10 kg/h. Directly after melting the pills, the liquid catalyst, as described in DE 197 15 679, was injected in such a quantity that 1 equivalent (Val) of active liquid catalyst is present per 225 mol parts of lactam-12. The liquid catalyst immediately initiates the polymerization so that a compact polymer strand can be withdrawn at the nozzle, which strand is then cooled in a water bath, followed by granulation and drying of the granulate ready for processing.

In order to obtain a first overview of the effectiveness of the substances according to the invention which destroy the catalyst, the granulates were pre-mixed with the corresponding additives and these mixtures were injection moulded on a commonly used injection moulding machine, type Arburg-Allrounder 320–210–750 Hydronica, into 4 mm thick ISO tension bars, normal injection moulding conditions being maintained corresponding to a melt temperature of 258° C., a mould temperature of 40° C. and a cycle time of 50 seconds.

The results are compiled in FIG. 1 (Table 1), tests designated respectively with X being comparative tests.

They show how, by using the deactivators according to the invention which are only applied onto the granulate before the injection moulding operation, the degradation on melting is very substantially reduced.

In test X1, where pure, anionically polymerized granulate was injection moulded identically into test pieces, a very much higher viscosity degradation occured. The measured volume melt index values also confirm the strong degradation during remelting of anionically polymerised PA12 granulate on the comparative test X1 where no deactivator was added. At the same time the low MVR values of tests 1–6 verify that only a low degradation occurs during melting if deactivators according to the invention are mixed into the melt during the injection moulding processing.

The following tests describe the continuous production of anionically polymerized polyamide granulate according to the invention which is of high stability in the melt state with respect to viscosity degradation.

This new polyamide granulate can be processed exceptionally well via the melt state by thermoplastic shaping processes such as injection moulding and extrusion into pipes, films and coatings of high service value.

The polyamide granulates produced according to the new processes have property combinations not known to date so that parts produced therefrom have in addition to good heat stability, very good weathering stability and an extraordinarily high hydrolysis stability in aqueous media. Pipes produced therefrom have for example a high degree of low temperature toughness not known to date and also high resistance to internal pressure even at temperatures up to 130° C.

In order to produce the polyamides according to the invention in granulate form, the process can be implemented for example in two stages by proceeding for example in a first extrusion passage as in the case of test 1–6 and thereby converting laurin lactam into polylaurin lactam by means of a liquid catalyst according to DE 197 15 679.

In a second extrusion passage, the components which destroy the catalyst and often at the same time are able to take up the required supplementary functions are added.

The deactivator is thereby melted preferably under mild conditions and with intensive mixing together with the polylactam granulate produced in the first process step so that its effect is rapidly developed by neutralizing in particular the strong basicity of the melt. Further components of the formulation required for practical application, such as stabilizers, plasticizers, colourants, such as carbon black and further necessary additives, can be introduced for example directly into the melt also at a later stage of the extrusion process or in the case of liquids, such as plasticizers, can be injected directly into the melt.

Alternatively, the process can be implemented however also in a one stage method, the continuous conversion of the lactam into polylactam being effected in a first process step, preferably by means of a liquid catalyst, and an appropriate design of the extruder, then the melt being stabilized against viscosity change by means of the deactivator which neutralizes the catalyst activity and simultaneously or subsequently further components being added to the final formulation and then being mixed-in, then the melt being discharged as a strand, being cooled and the solidified strand being granulated so that after drying a processing-ready granulate is present or the melt being supplied directly into a tool for shaping.

The one stage production process requires furthermore only an average residence time of approximately 2 minutes, the deactivation in the second extruder zone being included. The high economic efficiency is thereby demonstrated if one considers that several hours are required for the hydrolytic production of polylactam.

The process conditions are in principle able to be varied within a wide range.

Preferably however the procedure is implemented in such a way that the polymerization time in the chosen set conditions of the extruder, such as tempering of the heat zones and screw speed, is just adequate to convert 99–99.8% by weight of the lactam-12 and after that the catalyst is destroyed by addition of the deactivator. In the case of lactam-6, polymerization takes place preferably in the known, temperature-dependent range of the monomer/polymer equilibrium. If the two step process is thereby used, this can be achieved easily by appropriate setting of temperature control, throughput and screw speed.

Comparative tests X3, X4, and X5 and examples 10–15

By use of the twin screw extruder, ZSK-25, polyamide-12 granulates were again produced using the normal compounding screw and starting from laurin lactam and liquid catalyst.

The test conditions and the test results of the comparative tests are compiled in FIG. 2 (Table 3).

As the analysis results show, the melting with only one passage through the MVR appliance effects already a considerable viscosity degradation.

Tests 10–15

The PA-12 base granulates, produced in the comparative test X3–X5 and still viscosity-unstable, were now pre-mixed with the deactivators according to FIG. 3 (Table 4) and the substance mixtures then were melted gently on a twin screw extruder ZSK-30, equipped with a compounding screw, so that the deactivators are able to exert their influence of catalyst deactivation and modification of the melt, liquid additives, in particular plasticizers, being injected into the melt directly in a later stage of the compounding. The melt which now contains the catalyst residues in deactivated form and also additives mixed-in homogeneously, is then introduced into an aqueous cooling bath via a nozzle, the solidified strand is granulated and the granulates are dried, after which a processing-ready, processing-stable granulate is present. This can be processed dependent upon the formulation into plasticized PA-12 pipes, into injection moulded parts, into sheaths of cables, into foils and into coatings via thermoplastic processes without degradation occurring and into finished parts which have excellent properties. The formulations and properties of the PA-12 moulding compounds according to the invention are compiled in FIG. 3.

The measurement of the $\eta_{rel}$ values proves impressively that, both during MVR measurement and also during processing into pipes and cable sheaths, the new polyamides are viscosity-stable during remelting.

Tests 16–19

During these tests, the following goals were striven for:

1. The polymerization and the compounding must be effected in one extrusion step.
2. During compounding, effective heat- and weathering stabilizers should be incorporated into the melt.
3. The behaviour of test pieces made of polyamide moulding formulations according to the invention should be tested in a comparative test under heat and light effect (weathering).

For this purpose, the extruder, ZSK-25, which was used already in the previous polymerization tests was used, but the twin screws were modified such that the feed and the melting of the lactam-12 pills was effected approximately in the first third, then the already previously described liquid catalyst was metered continuously into the melt, so that the polymerization of the lactam proceeded in the second third of the extruder, the extruder shafts were subsequently fitted with elements preventing backflow of viscous melt, subsequently in the last third, the deactivator and the stabilisers were metered into the melt via a so called "side-feeder" and then were mixed-in homogeneously, the melt was then withdrawn as a strand, this was granulated and the granulate was dried to a processing-suitable water content of lower than 0.15% by weight.

The following conditions were maintained in the polymerization zone:

1 mol equivalent of liquid catalyst was added continuously per 200 parts of lactam-12
  the extruder housings after the injection point of the catalyst were set at 290° C.
  the rotational speed was set at 200 rpm with a total mass throughput of 14 kg/h.
  Temperature increase to 290° C. was effected in order to accelerate conversion because, during implementation of this test, only ⅓ of the extruder length was available for the polymerization.

In order to increase the total quantity of additives metered into the melt via side-feeders to at least 5% by weight, partly anionically polymerized PA12 granulate (PA12, A) from previous tests was metered into the melt together with the recipe components.

The following combination of stabilizers was used for all tests (even X6): 0.3% by weight Irganox 245, 0.15% by weight Irganox P-EPQ (=stabilizers by Ciba, SC, Basel) and also 0.5% by weight Nylostab S-EED (=stabilizer by Clariant).

The added deactivators are represented in FIG. 4 (Table 5a). Test X6 once again represents thereby a comparative test, in the production of which no deactivator was added in the narrow sense.

The relative viscosity $\eta_{rel}$, the MVR and subsequently again $\eta_{rel}$ in the sample after MVR measurement were determined. The difference $\Delta q_{rel}$ of both relative viscosities corresponds to the degradation during melting which is however dependent upon the starter value. The inventors have however found the surprisingly simple empirical formulation that the viscosity-corrected degradation, calculated according to the formula $VKA = \Delta\eta_{rel}/(\eta_{sp.1})^2$, for a specific material composition remains, independently of the starter value of the relative viscosity, virtually constant ($\eta_{sp.1}$ being the specific viscosity before melting, with $\eta_{sp}=\eta_{rel}-1$). Thanks to this knowledge, VKA is a characteristic dimension for evaluation of the degradation stability of the polyamide. Moreover, the molecular weight distribution was measured.

Furthermore DIN impact tensile bars were moulded from the granulates and these were subjected to a heat test at 150° C. Likewise, a rapid weathering test was implemented in a Wether-0-meter appliance.

The results of all these tests are contained in FIG. 5 (Table 5b).

It should be taken into account during evaluation of the tests in Table 5b that the stabilizers used in comparative test X6 already act upon the catalyst up to a certain degree in a deactivating manner so that the viscosity degradation in the MVR test is smaller than in corresponding measurements on pure, anionically polymerized granulate.

The MGV measurements are interesting. It should be taken into account that the polymerization conditions on the extruder were chosen such that polymerization is essentially finished after ⅔ extruder length.

During test X6, where the catalyst activity is maintained at least in part, a broader MG distribution resulted and in particular many short-chain molecule fragments are produced.

In the tests 16–19 on the other hand, the effectiveness of the catalyst is stopped entirely by the deactivator and the molecular weights remain high with a D-value close to 2, as is common also in hydrolytically produced polyamide.

In the tests 16–19, the results are somewhat worse where the low-molecular compound Luvax EAS (EAS=ethylene acrylic acid) was used. They are particularly good in tests 16, 18 and 19 where high-molecular acidic compounds are used as deactivator.

The effect of the higher molecular weight of these compounds is demonstrated also in the heat test at 150° C. where the variant X without deactivator fails already after 72 hours, followed by the variant Luvax EAS whilst then in the tests with high-molecular weight deactivator a substantial decrease in strength only occurs after 8 days.

During rapid weathering in the Wether-0-meter, all variants display exceptionally good behaviour up to 2000 h.

With respect to the level of the SZZ values, the following substantial correlation should be taken into account.

The salvation agent contained in the liquid catalyst greatly affects the increase in toughness so that also finished parts based on lactam-12 polymerised with liquid catalyst have a high toughness and fracture strength. If such parts are now subjected to extreme heat effect, for example a heat test at 150° C. then the salvation agent of the used liquid catalyst is initially evaporated and the tensile impact strength falls to the normal level of PA12, as it is known for hydrolytically produced PA12. This relevant plateau is then maintained until the effectiveness of the stabilizer combination recedes. The half-life rule which is hydrolytically common with PA12 must therefore not be applied for evaluation of the heat resistance but instead the achieved level of toughness after evaporation of the salvation agent must be selected for example after 48 h heat effect as the basis for the subsequent drop in strength.

Tests 20–24

The tests 20–24 relate to further testing of deactivators of anionic catalysts for the polymerization of lactam.

For this purpose, anionically polymerized PA12 granulate was produced without additives as a first stage under mild conditions with a simple compounding screw on the ZSK-25 in one extrusion passage.

Polymerization was thereby implemented at a temperature setting of the housings of 260° C. respectively, a rotational speed of 150 rpm and with a throughput of 13 kg/h, and a catalyst to LC-12 mol ratio of 1:125.

As already described previously, this granulate was then re-extruded on a ZSK-30 with additives according to FIG. 6 (Table 6). The deactivators and the base granulate were there-by supplied together to the extruder and melted so that they were able from the start to exert their deactivating effect.

The additives used and the effect of the deactivators which stabilises the viscosity of the melts, is illustrated by means of $\eta_{rel}$ and MVR measurements in Table 6.

As the measured, mechanical values on test pieces produced by the injection moulding method prove conclusively, test pieces with excellent mechanical properties based on the PA12 granulates according to the invention result despite the relatively low molecular weight.

What is claimed is:

1. A polyamide with low viscosity degradation after remelting, which can be produced by anionic polymerization of lactam in the presence of alkaline catalysts and if necessary activators, wherein the polyamide contains a protic compound as deactivator and has a relative viscosity $\eta_{rel}$ of >1.55, measured on a 0.5% by weight solution in m-cresol according to EN ISO 307, and during remelting at 275° C. and with a water content of less than 0.15% by weight has a viscosity-corrected degradation $$VKA = \Delta\eta_{rel}/(\eta_{sp.1})^2 \text{ of } \leq 0.13$$

2. The polyamide according to claim 1, wherein it has a polydispersity D $\leq$5.0.

3. The polyamide according to claim 1, wherein the VKA is $\leq$0.10.

4. The polyamide according to claim 1, wherein the $\eta_{rel}$ is $\leq$1.7.

5. The polyamide according to claim 1, wherein the protic compound is chosen from organic carboxylic acids in low molecular, oligomeric or polymeric form and/or acids of phosphorus and boron, the protic compound being still present in its protic form at least in a residual proportion of 1% of the starter value.

6. The polyamide according to claim 5, wherein the organic carboxylic acid is present in the form of an oligomeric wax-like product.

7. The polyamide according to claim 6, wherein the copolymer is an ethylene (meth) acrylic acid copolymer.

8. The polyamide according to claim 5, wherein the carboxylic acid is a copolymer with monomers which contain acid groups, said monomers being present partially as salts (ionomers).

9. The polyamide according to claim 8, wherein it concerns copolymers of ethylene, the salts being derived from at least one of the elements Li, Na, K, Ca, Mg and Zn.

10. The polyamide according to claim 1, wherein the lactam is chosen from the group consisting of lactams with 5 to 12 C atoms.

11. The polyamide according to claim 1, wherein the catalyst is a metal lactamate or a lactamate-forming compound.

12. The polyamide according to claim 1, wherein the activator is chosen from acylated lactams, isocyanate and/or carbodiimide, which also can be present in capped or cyclized form.

13. The polyamide according to claim 1, wherein the catalyst is a catalytically-acting liquid system, which contains the activator and the catalyst in a liquid, polar, aprotic solvation medium.

14. The polyamide according to claim 1, wherein it is present in the form of a granulate.

15. The polyamide according to claim 1, wherein it is present in the form of fibers, foils, plates, pipes, coverings, injection molded and profile parts and the like.

16. A method for producing a polyamide with low viscosity degradation after remelting from lactam in the presence of alkaline catalysts and if necessary activators in an extruder, comprising convening the lactam melt with the catalyst at a temperature of 140–320° C. in the extruder in a first step a) until a lactam conversion of at least 90% is achieved and in that then, in a step b), adding a protic compound as deactivator, the acidic groups of the deactivator being present in an at least equimolar concentration in relation to the concentration of the catalyst.

17. The method according to claim 16, wherein the temperature in method step a) is 140–300° C.

18. The method according to claim 16 wherein during step a), the conversion is carried out up to a lactam conversion of at least 99%.

19. The method according to claim 16, wherein the production is effected in one extrusion passage.

20. The method according to claim 16, wherein at least two extrusion passages are effected, the first extrusion passage serving for the polymerization and the second passage serving especially for the deactivation of the catalyst.

21. The method according to claim 19 wherein twin screw extruders are used.

22. The method according to claim 21, wherein twin screw extruders with co-rotating operating screws are used.

23. The method according to claim 16, wherein the deactivator is chosen from organic carboxylic acids in low molecular or polymeric form and/or from acids of phosphorus and/or boron.

24. The method according to claim 16, wherein the deactivator is mixed-in homogeneously.

25. The method according to claim 16, wherein a lactam with 5–12 C atoms is used as the lactam.

26. The method according to claim 16, wherein a catalytically acting liquid system is used for initiating the lactam polymerization, which system contains the activator and the catalyst in a liquid, polar, aprotic solvation medium.

27. The method according to claim 26, wherein the liquid system is mixed homogeneously into the lactam melt at the beginning of step a).

28. A method for reprocessing of polyamide which is produced from lactam in the presence of alkaline catalysts and if necessary activators,wherein the polyamide is comminuted and mixed with a deactivator, the deactivator being added in a quantity, by means of which at least the basicity still present from the catalyst system is neutralized and in that subsequently the mixture is melted if necessary with addition of auxiliary agents and finally is extruded.

29. The method according to claim 28, wherein the melting and extrusion are implemented in a twin screw extruder.

30. The method according to claim 29, wherein twin screw extruders with co-rotating operating screws are used.

31. The method according to claim 28, wherein the deactivator is chosen from organic carboxylic acids in low molecular or polymeric form and/or from acids of phosphorus and/or boron.

32. The method according to claim 28, wherein the deactivator is mixed-in homogeneously.

33. The method according to claim 28, wherein filament structures, which are in a polyamide matrix and represent composite materials, are used as polyamide.

34. The polyamide according to claim 10, wherein the lactam is chosen from the group consisting of: lactam-6 and lactam-12 or a mixture thereof.

35. The method according to claim 16, wherein the temperature in method step a) is 140–280° C.

36. The method according to claim 25, wherein the lactam contains 6 or 12 C atoms or a mixture thereof.

* * * * *